United States Patent [19]

Holberg

[11] 3,781,882
[45] Dec. 25, 1973

[54] ADAPTIVE DIGITAL AUTOMATIC GAIN CONTROL FOR MTI RADAR SYSTEMS

[75] Inventor: Dieter E. Holberg, Pacific Palisades, Calif.

[73] Assignee: Hughes Aircraft Company, Culver City, Calif.

[22] Filed: Sept. 30, 1970

[21] Appl. No.: 76,850

[52] U.S. Cl.............. 343/7 A, 343/5 DP, 343/7.7
[51] Int. Cl. ......................... G01s 9/02, G01s 9/42
[58] Field of Search............... 343/5 GC, 5 DP, 7.7, 343/7 A

[56] References Cited
UNITED STATES PATENTS

| | | | |
|---|---|---|---|
| 3,643,257 | 2/1972 | Thomson | 343/7.7 |
| 3,267,468 | 8/1966 | Stull, Jr. | 343/7.7 |
| 3,404,399 | 10/1968 | Eschner, Jr. | 343/5 DP |
| 3,495,244 | 2/1970 | LaRosa | 343/5 GC |

Primary Examiner—Malcolm F. Hubler
Attorney—James K. Haskell and Walter J. Adam

[57] ABSTRACT

An adaptive digital automatic gain control (DAGC) system is disclosed for pulsed radar moving target indicator (MTI) systems to reduce the input dynamic range requirements of a data processing and display system by dividing each range sweep into a number of range elements of one or more range bins, comparing the signal level in each range element to a selected reference level, and providing a digital error signal indicating whether or not the video signal is greater than the reference signal. The radar video signal is processed by an MTI filter, the output of which is compared with a selected reference level to similarly provide digital error signals for AGC control based on not only the raw radar video signal, but also the MTI video signal. These digital error signals are integrated separately for each range element, thereby developing for each range element an AGC signal in digital form based on the past history in the raw radar video signal and the MTI video signal over a continuous succession of range sweeps. After conversion into analog form, these digital AGC signals developed for all range bins of a given sweep are filtered by a low pass filter to provide an analog AGC signal which is smooth over approximately 16 range bins. A noise AGC signal is similarly developed and combined with the radar video and MTI video AGC, but at a much slower rate of one sample per azimuth scan.

8 Claims, 8 Drawing Figures

ADAPTIVE DIGITAL AUTOMATIC GAIN CONTROL FOR MTI RADAR SYSTEMS

BACKGROUND OF THE INVENTION

This invention relates to adaptive automatic gain control (AGC) for pulsed radar systems, and particularly to adaptive digital automatic gain ontrol (DAGC) for radar systems having moving target indicator (MTI) filters. In the past, it has been difficult to detect weak moving target signals in radar video signals having strong ground clutter. In a typical MTI radar system, the dynamic range of clutter and target signals is much larger than the dynamic range of the radar receiver and MTI data processor. It would be desirable to develop an automatic gain control signal to be applied to the receiver with a gain-versus-range profile which will insure optimum suppression of clutter and noise for the dynamic range of a given receiver and data processor.

Heretofore, either a limiter or linear-logarithmic amplifier has been used to match a radar receiver and data processor to a large dynamic range of the video signal having substantial clutter and noise. However, both techniques widen the spectral width of the clutter and noise, and therefore reduce the effectiveness of clutter and noise rejection. It would be desirable to control the receiver gain such that the noise and clutter level is automatically adjusted to the optimum operating level for a given radar receiver and data processor, thereby optimizing subclutter visibility under all clutter conditions.

SUMMARY OF THE INVENTION

Briefly, the present invention reduces the dynamic range requirements on a radar receiver and data processor by developing a clutter-adaptive AGC signal which controls the receiver gain such that clutter at a given range appears at a substantially constant level during each successive range sweep. The radar system divides the total range coverage into a number of range elements of one or more range bins, and the adaptive AGC system compares the radar video signal level in each range element with a selected reference level to provide a binary signal indicating whether or not the radar video signal level is greater than the reference level. These binary signals are integrated, separately for each range element, during one out of every N range sweeps, where N is an arbitrary number from 1 to about 20 depending on the properties of the MTI processor. The integrated signals are then converted into an analog signal to provide an AGC signal to be applied to the radar receiver.

If the radar video signal level in any particular range element is initially too high, a binary 1 signal is developed and converted into an AGC signal which reduces the receiver gain or that range element in the next range sweep. If the resulting reduction in gain is not sufficient to reduce the radar video signal to the reference level, a binary 1 signal is developed when a comparison of the radar video signal is again made with the reference level. That binary signal is added to the previous binary signal in the integrator, thereby increasing the AGC signal to further decrease the receiver gain for the particular range element during the next range sweep. In this manner, the sum of the binary signals increases until the corresponding AGC signal is sufficiently large to reduce the radar video signal and thereby cause a binary 0 signal to result from a comparison with a reference. This binary 0 signal then decreases the sum so that the receiver gain is increased during the next range sweep. The receiver gain ultimately fluctuates about the desired reference level. In order not to degrade the subclutter visibility, this fluctuation is kept sufficiently small by selecting a small increment of change in receiver gain for a unit change in the sum, and by filtering the sum in a low pass filter after conversion from digital to analog form. The time constant for the filter is selected to provide smoothing cover a predetermined number of range elements of a given range sweep.

Similarly, the receiver gain is also controlled by the output signal of an MTI filter operating on the radar video signal. This MTI filter output signal, called MTI video, is filtered by a low pass filter to provide smoothing over a predetermined number of range elements and compared with a selected reference to produce binary signals for MTI video in a manner similar to producing binary signals for radar video clutter. The MTI video signals are integrated and converted into a second DAGC signal which is combined with the first DAGC signal before conversion and filtering of the first analog signal. Thus, the first and second analog signals are combined, filtered and used to control the receiver gain on a range element basis at the time the radar video signals of corresponding range elements are received.

In accordance with a further feature of the invention, the radar receiver noise is also automatically controlled to a predetermined level. The radar video noise is sampled once per scan at a time when no radar echoes appear and compared with a selected reference level to produce binary signals in a manner similar to the development of binary signals for radar video and MTI video. These binary signals for radar noise are integrated, and converted into an analog voltage which is added to the combined radar video and MTI video AGC signal for an adaptive AGC signal used to control the receiver gain.

It is therefore an object of this invention to provide an adaptive automatic gain control system in a pulsed radar system using digital techniques.

A further object is to provide adaptive automatic gain control in a pulsed radar system such that clutter appears at a constant level independent of range.

A further object is to provide an adaptive automatic gain control system in a pulsed radar system having a moving target indicator filter such that an automatic gain control signal is developed from clutter in the video signal and the clutter residue at the output of the moving target indicator filter to improve detection of moving targets in clutter.

A further object is to provide for a pulsed radar system having a moving target indicator filter an adaptive automatic gain control signal, the amplitude of which varies from range element to range element as a function of samples during corresponding range elements from only one range sweep for every moving target filter period of a predetermined number of range sweeps, where the samples are of the video signal into the filter and of the output signal from the filter.

Still another object is to provide an adaptive automatic gain control signal developed from clutter in the video signal and noise in the video signal, where the latter component is developed from a sample of the video signal at a time of no radar return at a rate on the order of once per azimuth sweep by comparing the sampled video signal with a selected reference level, providing a digital error signal corresponding to the polarity of the difference, and integrating the digital error signals.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
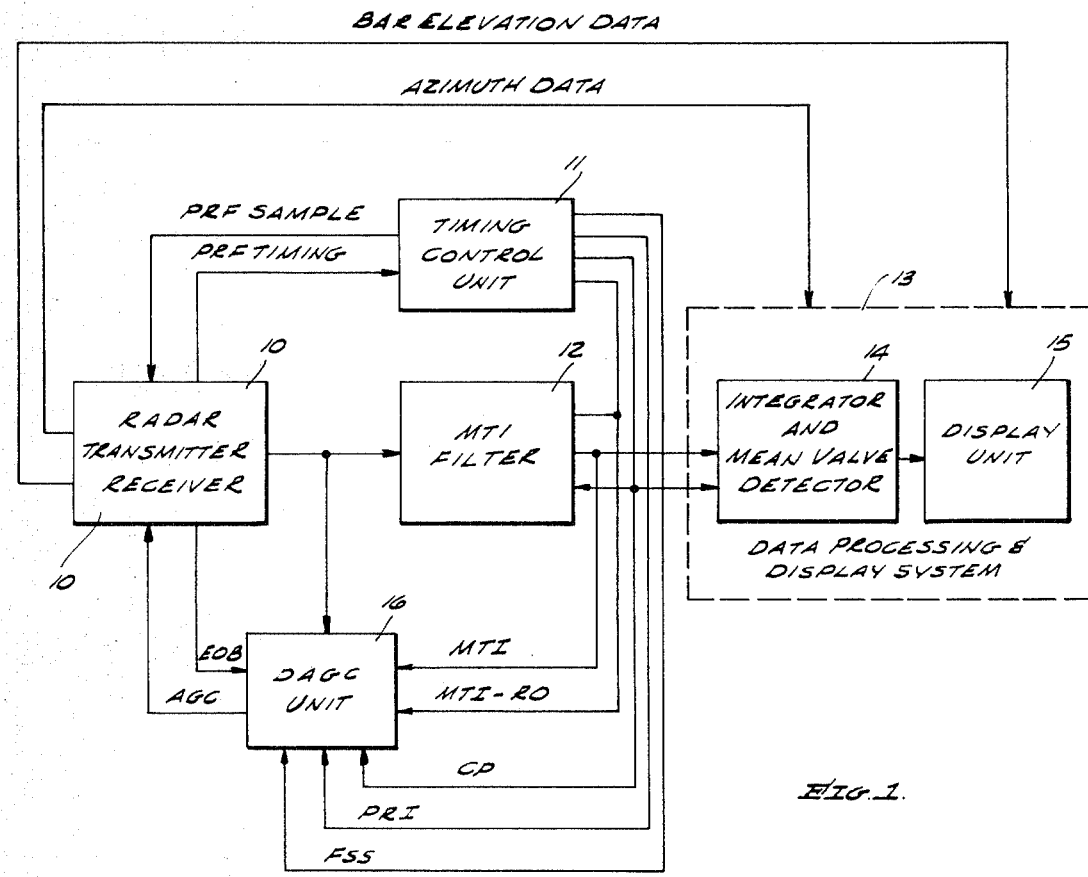
FIG. 1 is a schematic block diagram of a pulsed radar system having an MTI filter, and an adaptive AGC system in accordance with the present invention.

Referring now to FIG. 1, a radar surveillance system is shown comprising a radar transmitter/receiver 10 which receives PRF timing signals from a timing control unit 11 to transmit a pulse of energy and receive reflections of the pulse transmitted. The reflected energy received is applied to a moving target indicator (MTI) filter 12 as a video signal.

Implementation of the MTI filter may consist of means for subtracting consecutive radar returns, where each radar return corresponds to a range bin in a given range sweep. The timing control unit 11 receives from the radar transmitter/receiver 10 a sample of the PRF pulse generator which produces a predetermined number of clock pulses (CP) before another PRF pulse is transmitted, such as 853 clock pulses, which then define 853 consecutive range bins for a given range sweep.

The MTI filter 12 transmits to a data processing and display system 13 an MTI signal where the MTI signal is processed by an integrator and mean value detector 14 for display in a unit 15. The data processing and display system 13 is synchronized by the range bin clock pulses from the timing control unit 11 and an azimuth signal from the radar transmitter 10. For example, the display unit 15 may comprise a cathode ray tube and the display may be a B scan such that the cathode ray beam is controlled in the X-axis by the azimuth signal and in the Y-axis by the range bin clock pulses.

The radar transmitter receiver 10 may be of the type adapted for aircraft surveillance such that successive azimuth sweeps are made at different elevations commonly referred to as bar elevations. After scanning through a number of bar elevations, typically 4 or 8, the radar transmitter receiver 10 repeats the bar elevation scan pattern. During the azimuth sweep at a given bar elevation, video signals are transmitted by the integrator and mean value detector 14 to the display unit 15 for display of targets.

It should be noted that the radar transmitter receiver 10, timing control unit 11, MTI filter 12 and data processing and display system 13 comprise a radar surveillance system that is typical of conventional airborne or stationary radar surveillance systems, and that reference to an aircraft surveillance radar operating in a bar elevation scan mode is by way of example and not by way of limitation. The present invention relates to a digital automatic gain control (DAGC) unit 16 which is advantageously added to such a conventional radar surveillance system to improve subclutter visibility (detection of weak MTI signals in the presence of strong ground clutter as well as radar video noise).

In a typical data system, the dynamic range of clutter and target signals is much larger than the range of the receiver and data processor. The function of the DAGC unit 16 is to adjust the video signal level into the MTI filter 12 to maintain an optimum amplitude of the MTI signal into the data processing and display system as the amplitude of the radar signal received varies.

In FIG. 1, the DAGC approach is described in connection with a conventional noncoherent MTI radar. The DAGC approach is however equally applicable in connection with a coherent airborne or stationary MTI radar. In the latter case, the radar video portion of the DAGC operates not from the bipolar video fed to the MTI filter, but from a separate conventional amplitude detector providing unipolar video, as implied in FIG. 1.

The output of the DAGC unit is an AGC signal having three components. The first component is an AGC signal proportional to noise in the radar video signal. Since the noise level drifts very slowly, only one sample of the radar video signal is taken during each azimuth sweep of the radar. The other two components are AGC signals proportional to clutter in the radar video signal and in the output of the MTI filter. Since clutter varies at a fast rate, more frequent samples of the radar video signal and MTI signal are taken. Ideally, the radar video signal of each successive range sweep would be processed to develop a component of the AGC signal. This is one possible mode of the DAGC concept disclosed. However, since the MTI signal is read out of the MTI filter only once during every filter formation period, it is preferred to update the radar video component also only once during every filter formation period. And to conserve hardware, it is preferred to OR the samples into a single channel for developing an AGC signal in accordance with the present invention so that in practice, there are only two channels for developing AGC signals which are added at the output of the DAGC unit, one for noise and one for clutter.

Figure 2:
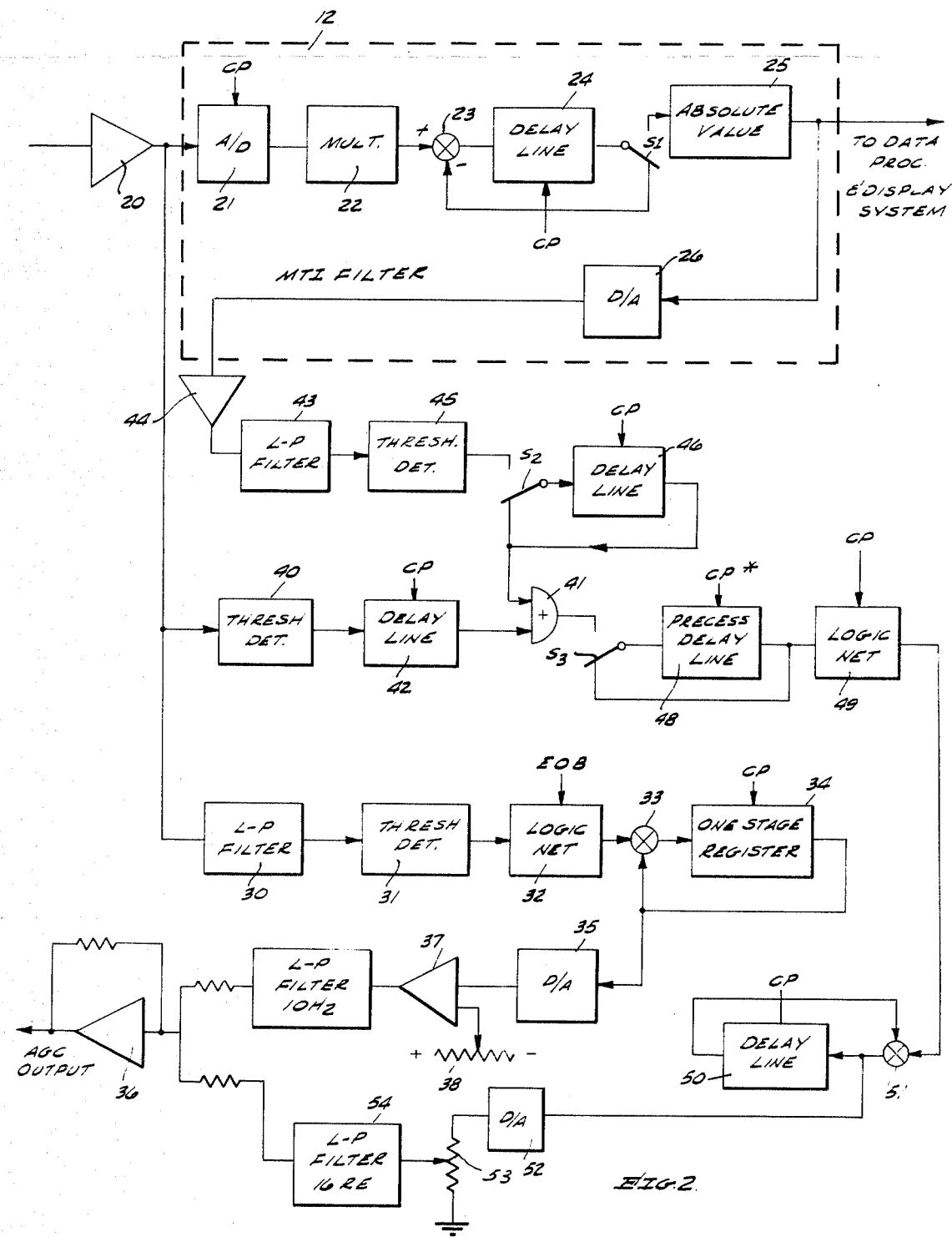
FIG. 2 is a schematic block diagram illustrating a preferred implementation of the adaptive AGC system of FIG. 1.

The MTI filter 12 and DAGC unit 16 of FIG. 1 will now be described with reference to a block diagram in FIG. 2. However, it should be understood that the MTI filter is not per se a part of the present invention.

An input amplifier 20 is employed to couple the radar video signal to the MTI filter 12. It clamps the referenced voltage of the radar video signal to a stable reference level such as −2.5 volts dc.

The MTI filter 12 is a digital filter which provides about 40db clutter rejection. The clamped, unipolar radar video signal from the amplifier 20 is applied to an analog-to-digital (A/D) converter 21 at the input of the MTI filter 12. The converter encodes each sample of the clamped video signal (of up to 5 volts peak to peak, and 1.8 MH₂ bandwidth) into an 8-bit number in 278 nanoseconds with a fixed delay of approximately 680 nanoseconds.

The A/D converter includes at the input a sample-and-hold circuit activated by range bin clock pulses from the timing control unit 11 to provide conversion of a sample from each range bin. A digital multiplier 22 weights the data from the converter 21 by a series of coefficient values. The MTI filter is formed by superimposing certain fixed references of digitized radar video sweeps weighted by optimum weighting coefficients. These sequences have a length of 2 to 20 radar sweeps.

Since this weighting relates to different MTI filter modes, and the filter does not per se form a part of the present invention, it is sufficient to understand that output of the converter 21 may be weighted 8-bit unipolar numbers.

Each 8-bit weighted number is transmitted in parallel with a positive sign (0) to an adder 23 which adds the 2's complements of a number from a delay line 24 having 853 8-bit numbers stored in sequence. In practice, the delay line is comprised of eight shift registers having 853 stages, each shift register receiving range bin clock pulses.

Initially, all shift registers are empty so that during the first range sweep, the weighted values of the radar video return from 853 successive range bins are stored in sequence. During the next range sweep, these range bin values are subtracted from corresponding range bin values being received through the converter 21 and multiplier 22. During the next and subsequent range sweeps, each difference thus stored in the delay line 24 is subtracted from a corresponding range bin value received through the converter 21 and multiplier 22.

The output of the delay line 24 is permitted to recirculate during a number of successive range sweeps for each filter formation period. During the next range sweep the output of the delay line 24 is switched from the adder 23 to an absolute value unit 25 in response to an MTI readout (MTI-RO) control signal through a logic network represented by a two position switch $S_1$. If the sign bit of a number being read from the delay line 24 is negative, the 2's complement of the number being read is transmitted by the absolute value unit to the data processing and display system 13 (FIG. 1). The transmission lines from the output of the absolute value unit 25 are also connected to a digital-to-analog converter 26 which couples the digital MTI filter to the DAGC unit.

The digital MTI filter will provide about 40*db* clutter rejection, as noted hereinbefore, to provide detection of weak MTI signals in strong clutter. In a typical radar system, the dynamic range of clutter and MTI signals may be much larger than the dynamic range of the receiver and the processor. To bring the clutter and MTI signals within the dynamic range of a receiver and the data processor, an AGC signal is developed by the DAGC unit in accordance with the present invention to adjust the gain of the radar receiver as a function of not only clutter in the radar video signal at the input of the converter 21 but also residual clutter in the output of the MTI filter 12.

The digital-to-analog converter 26 coupling the output of the MTI filter to the DAGC unit serves merely to convert the output of the MTI filter from a digital form to an analog form. The DAGC unit is illustrated by the balance of FIG. 2.

The noise AGC channel of the DAGC unit receives the radar video signal through a low-pass filter 30 having a long time constant on the order of a hundred microseconds. This channel is activated only at the time when no radar echoes occur. This can be accomplished, for example, by programming the transmitter to omit one or more radar pulses at the end of each azimuth sweep to allow ample time for this sample. The output of the low pass filter 30 is connected to a threshold detector 31 which preferably consists of a differential input operational amplifier with a stable reference signal applied to the negative input. That reference signal is selected through a potentiometer to set the maximum receiver gain.

The output of the threshold detector 31 is applied to an input terminal of a logic network 32 which controls an adder 33 to add or subtract a binary 1 from a five bit number in a register 34 comprising five D-type flip-flops according to whether or not the radar video signal exceeds the threshold level. If the threshold level is exceeded, the threshold detector 31 transmits a binary signal to the logic network 32 to cause a binary 1 to be added; otherwise, the output of the threshold detector 31 is a binary 0 signal and the logic network 32 causes the adder 33 to subtract a binary 1 from the number. However, the logic network 32 is effective only when an end-of-bar (EOB) signal is applied thereto. That EOB signal is a pulse developed by a radar transmitter receiver at the end of each azimuth sweep.

The 5-bit output of the register 34 is continually converted to analog form by a digital-to-analog converter 35. The output of the converter 35 is coupled to a summing amplifier 36 through a buffer amplifier 37. The buffer amplifier 37 is a differential amplifier having a reference signal which may be adjusted through a potentiometer 38 for maximum receiver gain when the content of the 5-bit register 34 is zero.

The adder 33 includes logic to prevent the content of the 5-bit register 34 from being decreased to a number less than zero or increased to a number greater than full scale (111111) as will be described with reference to FIG. 4. Once the adaptive noise AGC channel raises the number in the 5-bit register 34 sufficiently to provide an AGC signal that will reduce the radar receiver gain to the point where the radar video signal will not exceed the reference level of the threshold detector 31, the logic network 32 will cause a binary 1 to be subtracted from the number in the register 34. This then would decrease the output of the converter 35, thereby increasing the effective receiver gain to cause the radar video signal to exceed the reference level of the threshold detector 31, and cause a 1 to be added to the number in the 5-bit register.

If the radar video noise remains constant, the number in the register 34 will be increased and decreased alternately at the end of each radar azimuth scan to produce an AGC signal about a desired reference level with fluctuations in the receiver gain of a fraction of a *db*, which is the selected sensitivity for a change of one binary digit in the number stored in the register 34. That sensitivity is designed into the digital-to-analog converter 35. Once the noise component of the AGC signal has been updated at the end of a radar azimuth sweep, that component is held constant throughout the next radar azimuth sweep.

The radar video clutter component of the AGC signal is developed in a somewhat similar manner, but on a range element basis, with the binary number developed for each range element updated every MTI filter formation period. To accomplish that, the radar video signal is applied to a threshold detector 40 similar to the threshold detector 31 such that the radar video signal is compared with a stable reference voltage set by a potentiometer associated with the threshold detector 40. The output of this threshold detector is a binary 1 if the radar video signal exceeds the reference voltage and a binary 0 if the radar video signal is equal to or less than the reference voltage. Thus the output of threshold detector 40 is a binary signal that is sampled during each successive range element period, thereby effectively sampling the radar video signal once during each range element period to determine whether the radar video signal exceeds the reference voltage.

Since this information regarding the radar video signal is to be combined with corresponding information about the MTI signal on a range bin basis through an OR gate 41, it is necessary to delay the radar video information signal a number of clock periods corresponding to the delay of a range element signal through the MTI filter. To accomplish that, the threshold detector 40 is coupled to the OR gate 41 by a shift register 42 having a number of stages corresponding to the number of range bin clock pulse periods that the radar video signal needs to be delayed so that information regarding it produced by the threshold detector 40 at any given time will pertain to the same range bin as information applied to a second input terminal to the OR gate 41.

It should be noted that the terms range bin and range element have been used interchangeably. A range bin is defined by the range bin clock pulse, and is therefore equal to the range resolution of the radar system. For the purpose of implementing the DAGC unit in the radar video and MTI signal channels, samples may be taken at the frequency of the range bin clock pulse, in which case a range element is equal to a range bin, or at a lower frequency, in which case a range element may be equal to several such range bins (typically ten). That could be readily accomplished by using a frequency divider to develop system clock pulses for the DAGC unit 16 from the range bin clock pulses. However, in this exemplary embodiment, the range element is assumed to be equal to a range bin so that the terms are interchangeable. If the range element is equal to more than one range bin, only the term range element is proper. In other words, only for this special case of a range element equal to a range bin may the terms be interchangeably used.

The channel for the MTI signal coupled to the second input terminal of the OR gate 41 includes a low-pass filter 43 having a time constant of about 16 range bins to reduce spikes and target signals, such that the digit-to-analog converter 26 provides an output that is essentially proportional to the clutter residue. A buffer amplifier 44 couples the low pass filter 43 to the converter 26.

The output of the low pass filter 43 is connected to a threshold detector 45 having a reference level selected such that the receiver gain is controlled to maintain the clutter level at the optimum operating level of the radar receiver and the data processing and display system. As with the threshold detector 40, when the input signal to the thresold detector 45 exceeds the reference, the output of the detector is at a binary-1 level, and when the input signal is equal to or less than the reference level, the detector output signal is at a binary-0 level.

Each time the MTI filter signal is read out in response to the control signal MTI-RO operating on the switch $S_1$, a switch $S_2$ is actuated by the same control signal to connect a delay line 46 to the output terminal of the threshold detector 45. With the switches $S_1$ and $S_2$ actuated to positions opposite the position shown, the MTI signal is readout, filtered, detected and stored in the delay line 46. Since those switches are activated for one full PRF (range sweep) period, residual clutter data for each of 853 range bins is stored in the delay line 46, and since the residual data has been quantized by the threshold detector 45 into a binary signal, the delay line 46 is preferably implemented as a shift register synchronized by range bin clock pulses.

Figure 3:
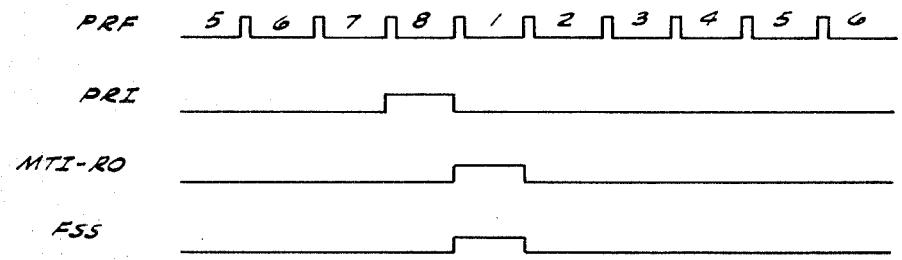
FIG. 3 is a timing diagram for the AGC system of FIG. 2.

At the end of the MTI readout period, the switch $S_2$ is returned to the position shown to allow the MTI residual clutter data to be recirculated until a switch $S_3$ is actuated to a position opposite that shown by a precess read-in (PRI) signal, at which time the stored MTI residual clutter data become ORed with radar video clutter data present in the range bins of a range sweep during which the PRI signal is present. Both the PRI and the MTI readout signals are generated by the timing control unit 11 (FIG. 1) only once every eight PRF periods. FIG. 3 illustrates the relative timing of the PRI signal which is generated during every eighth PRF period to read into a precess delay line 48 the content of the delay line 46. Immediately thereafter, during the first PRF period of the next sequence of range sweeps, the MTI-RO signal is generated to reload the delay line 46 with MTI residual clutter data.

The precess delay line 48 preferably consists of a shift register. When the precess read-in switch $S_3$ is in the position shown, the output of the precess delay line 48 is fed back to the input so as to recirculate the combined (ORed) MTI residual clutter data and radar video clutter data. The stored data is then used repeatedly during the following sequence of eight range sweeps.

During the precess read-in period, a predetermined number of extra precision clock pulses are applied, after all of the data has been entered into the precess delay line 48, to advance the data sufficiently to compensate for delays through the DAGC unit. In that manner the automatic gain control signal developed is correctly aligned with the radar video range elements. This is necessary because the binary signals of corresponding range elements sampled are to be integrated and converted into an analog signal to generate an AGC signal that controls the receiver gain at the times the radar video signals of corresponding range bins are being received during the next eight range sweeps.

Once a precess read-in operation has been completed and another MTI read-out operation is initiated, a filter sequence start (FSS) signal shown in FIG. 3 is generated to gate the content of the precess delay line 48 through a logic network 49 to an integrator comprising a delay line 50 and an adder 51. The integrator loop formed by the delay line 50 and the adder 51 will be incremented or decremented by a binary 1 depending upon whether or not the input signal to the logic network 49 from the precess delay line 48 is a binary 1. Thus, during the range sweep that the FSS signal is generated, the input to the logic network 49 will be a binary 1 to cause the adder 51 to increment the number being recirculated for a given range element. If the clutter level in that particular range element does not exceed the threshold, the input to the logic network 49 will be a binary 0 to cause the adder 51 to decrement the number being recirculated for that particular range element. The adder includes logic to prevent any recirculated number from being incremented above full scale or decremented below zero.

While the FSS signal is not present, the logic network 49 will cause the content of the delay line 50 to be recirculated without being incremented or decremented so that the AGC value thus generated for each of 853 range elements is updated only once every eight range sweeps under control of the signal FSS.

A digital-to-analog converter 52 is connected to the integrator delay line 50 to generate an analog AGC signal from the digital AGC signal developed by the integrator. The analog AGC signal is zero volts for zero digital AGC values and a negative voltage corresponding to non-zero digital AGC values. A potentiometer 53 at the output of the converter 52 sets the full scale value for the analog AGC signal. For the MTI processor referred to, the full scale selected is preferably one that provides about 0.5 db receiver gain change per incremental step of the digital AGC from the delay line 50.

The scaled analog AGC signal is coupled to the summing amplifier 36 by a low pass filter 54 having a time constant of approximately 16 range bins in order to average the AGC signal developed for successive range elements of a given range sweep, thereby smoothing the analog AGC signal in range. The AGC signal filtered is then applied to the radar transmitter receiver to maintain clutter and noise levels at predetermined values set by adjustment of reference voltages in the threshold detectors for the clutter and noise channels. In practice, the AGC signal may be applied to a stage of the IF amplifier in the receiver, but is preferably applied to a linear voltage controlled attenuator coupling the output of a preamplifier in the radar receiver to an IF amplifier. The output of the IF amplifier is then applied to an amplitude modulation detector to produce a unipolar radar video signal in a conventional manner.

In practice, the voltage controlled attenuator should include an AGC controlled amplifier in cascade with the attenuator in order to permit AGC control over a larger range of signal input levels without cross modulation and modulation distortion as may otherwise occur. The cascaded amplifier makes possible a 3db bandwidth in excess of 10 MH$_z$ with an overall gain between ±3db for a much greater control range (approximately 75db) than could be obtained with only the controlled attenuator or the controlled amplifier.

The noise AGC channel will now be described in greater detail with reference to FIG. 4. The radar video signal is filtered by the low pass filter 30 having a time constant on the order of 100 microseconds. The output of the filter 30 is connected to the threshold detector 31 comprising an operational (high gain) amplifier 60 having differential inputs with one input terminal connected to a potentiometer 61 through which the noise threshold level is adjusted. The output of the amplifier 60 is connected to the data input terminal of the logic network 32. The logic network may be implemented with a flip-flop FF$_1$, as shown, or in any other suitable manner.

If the noise threshold level is exceeded during a given range bin interval, the leading edge of an EOB signal produced as a rectangular pulse will set the flip-flop to cause the adder 33 to increase by one the number in the noise AGC accumulator comprising the 5-bit register 34 at the end of a radar azimuth sweep. If the noise level is not exceeded, the flip-flop will be reset to cause the adder to decrease by one the number in the accumulator. That may be accomplished by connecting a binary-1 voltage source $V_a$ to the least significant bit positions of the addend to the adder, and connecting the true output terminal of the flip-flop to the remaining four bit positions through a NAND gate 62 functioning simply as an inverter. Thus, while the flip-flop is set, the addend is a positive one (00001), and while the flip-flop is reset, the addend is a negative one (111111). A clock pulse occurring during the presence of the EOB signal is then transmitted through a NAND gate 63 to the register 34 to store a new noise AGC value. In that manner, the noise AGC component of the DAGC signal is updated only once every bar elevation sweep.

The adder is preferably implemented as a conventional parallel binary adder. However, as noted hereinbefore, the adder also includes logic for preventing the register 34 from receiving numbers greater than the full scale or less than zero. A zero in the register 34 is detected by a NAND gate 68 to force the outputs of each of a bank of NAND gates 69 true, but only if that number is to be decreased under control of the flip-flop. A second bank of NAND gates 70 then transmits a false signal to each of five input terminals of the register 34 which may comprise a bank of five D-type flip-flops. A NAND gate 71 detects a full scale number in the register 34 to force the output terminals of the bank of NAND gates 70 true, but then only if that number is to be increased under control of the flip-flop.

The output of the register 34 is transmitted in parallel to a conventional digital-to-analog converter 35 (FIG. 2) which continually transmits a noise AGC signal in analog form proportional to the number being stored in the register 34.

Figure 5:
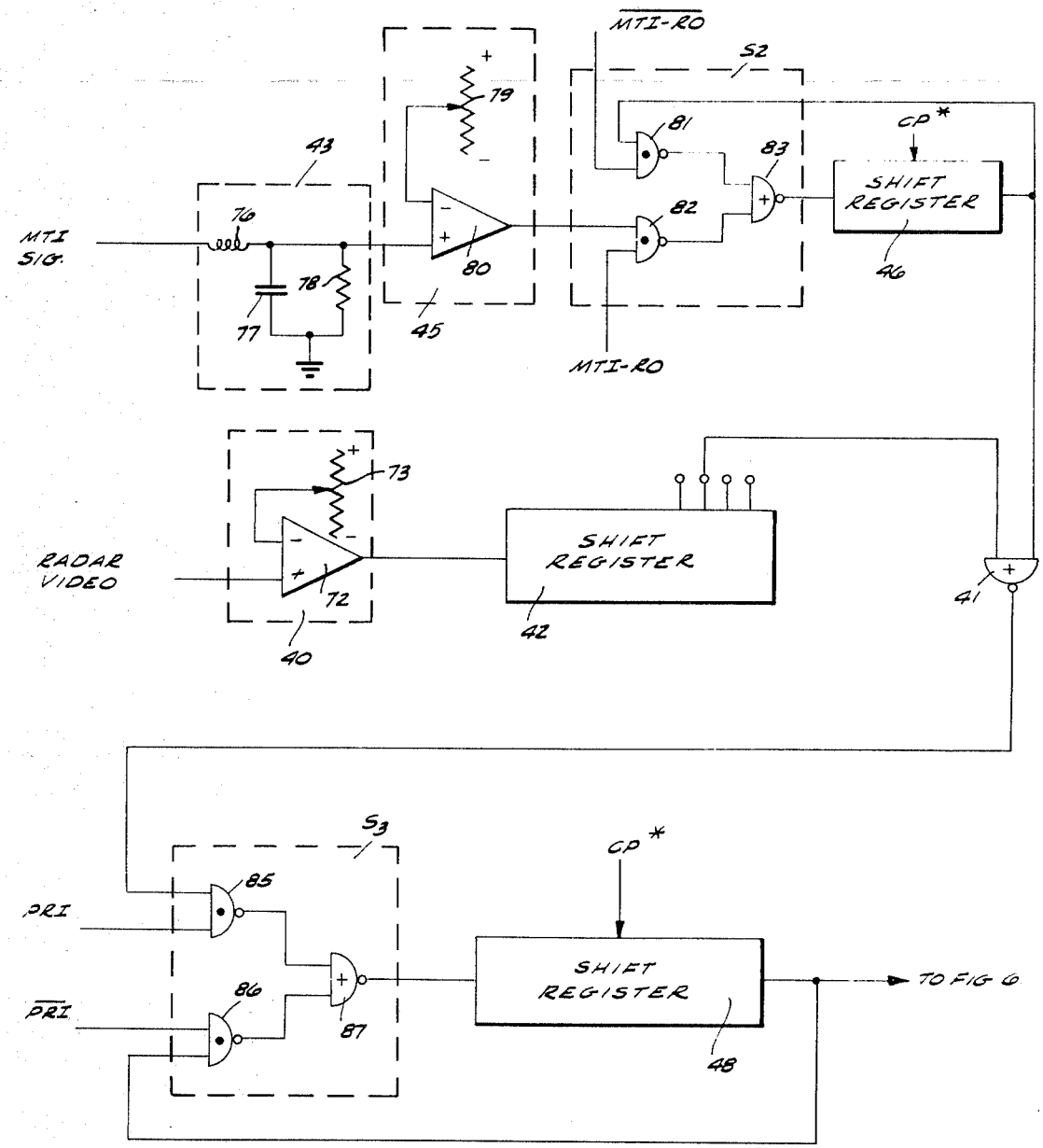
FIGS. 5 and 6 together form a logic diagram for a radar video and MTI clutter channel of the AGC system of FIG. 2.

The manner in which the radar video and MTI video are combined for the purpose of developing a digital AGC signal to maintain both clutter and clutter residue below a predetermined level, i.e., to maintain an optimum amplitude of the MTI signal into the data processing and display system 13 (FIG. 1) as the radar video amplitude varies, will now be described with reference to FIGS. 5 and 6. The radar video signal from the radar transmitter receiver 10 shown in FIG. 1 is applied to the comparator 40 shown in FIG. 5 comprising an operational amplifier 72 having differential inputs to compare the radar video signal with a reference level set by a potentiometer 73. The output of the amplifier 72 is a binary 1 if the radar video signal exceeds the reference set by the potentiometer 73, and binary 0 otherwise.

The binary signal thus produced for each range element by the amplifier 72 is stored in the shift register 42. A selected one of the stages of the shift register 42 is connected to the OR gate 41 in order to align the range element data in the radar video channel with range element data in the MTI channel.

The MTI signal is filtered by the low pass filter 43 over approximately 16 range bins comprising an inductor 76 of 5100 $\mu$n, a capacitor 77 of 2400 pf and a resistor 78 of 1K ohms. In the comparator 44, a comparison is made of the filtered MTI signal with a reference voltage set by a potentiometer 79 using an operational amplifier 80 having differential input terminals connected to receive the filtered MTI signal and the reference voltage. As noted hereinbefore, the filter 43 removes spikes and targets from the MTI signal, thus producing an output essentially proportional to the clutter residue. The output of the amplifier 80 is a binary 1 if the residual clutter exceeds the reference level set by the potentiometer 79, and a binary 0 otherwise.

Since the MTI signal is read out of the MTI filter 12 (FIG. 1) only once after each MTI filter formation period, the binary output of the comparator 45 is stored in the delay line 46 comprising a shift register only during the presence of a filter sequence start (FSS) signal, as described hereinbefore with reference to FIG. 3. At all other times, the switch $S_2$ comprising NAND gates 81, 82 and 83 will function to recirculate the contents of the shift register 46 in response to clock pulses applied thereto. The output of the shift register 46 is also continually being applied to the OR gate 41 so that combined radar video and MTI clutter data is available at the output of the OR gate 41.

During the presence of a precess read-in (PRI) signal, the switch $S_3$ comprising NAND gates 85, 86 and 87 will respond to the PRI signal to allow the combined data to be shifted into the precess delay line 48 comprising a shift register having 853 stages. The PRI signal also causes the timing control unit to transmit a train of clock pulses CP* which correspond to the 853 system clock pulses CP followed by a predetermined number of extra clock pulses before another train of range bins clock pulses is generated. That will precess (advance) the combined data in the shift register 48 a predetermined number of range elements sufficient to compensate for delay in developing the digital AGC signal and applying a proportional analog AGC signal to the radar transmitter and receiver 10 (FIG. 1). During range sweeps that a PRI signal is not generated, the data stored is continually read out and restored. The output of the shift register 48 is transmitted to the logic network 49 (FIG. 2) to allow the data in the delay line integrator 50 to be updated during the presence of the next filter sequence start (FSS) signal.

The system clock pulses CP may be generated by a counter preset to count 853 cycles from an oscillator, after which the oscillator is shut down until the next range sweep period is initiated by a PRF sample received by the timing control unit 11 from the radar transmitter receiver 10. A second counter may count the range sweeps up to a number equal to the number of the range sweeps used in the MTI filter formation period and then after the clock pulse counter for one range sweep cycle to count the desired number of clock pulses CP* by presetting it to a different number.

Figure 6:
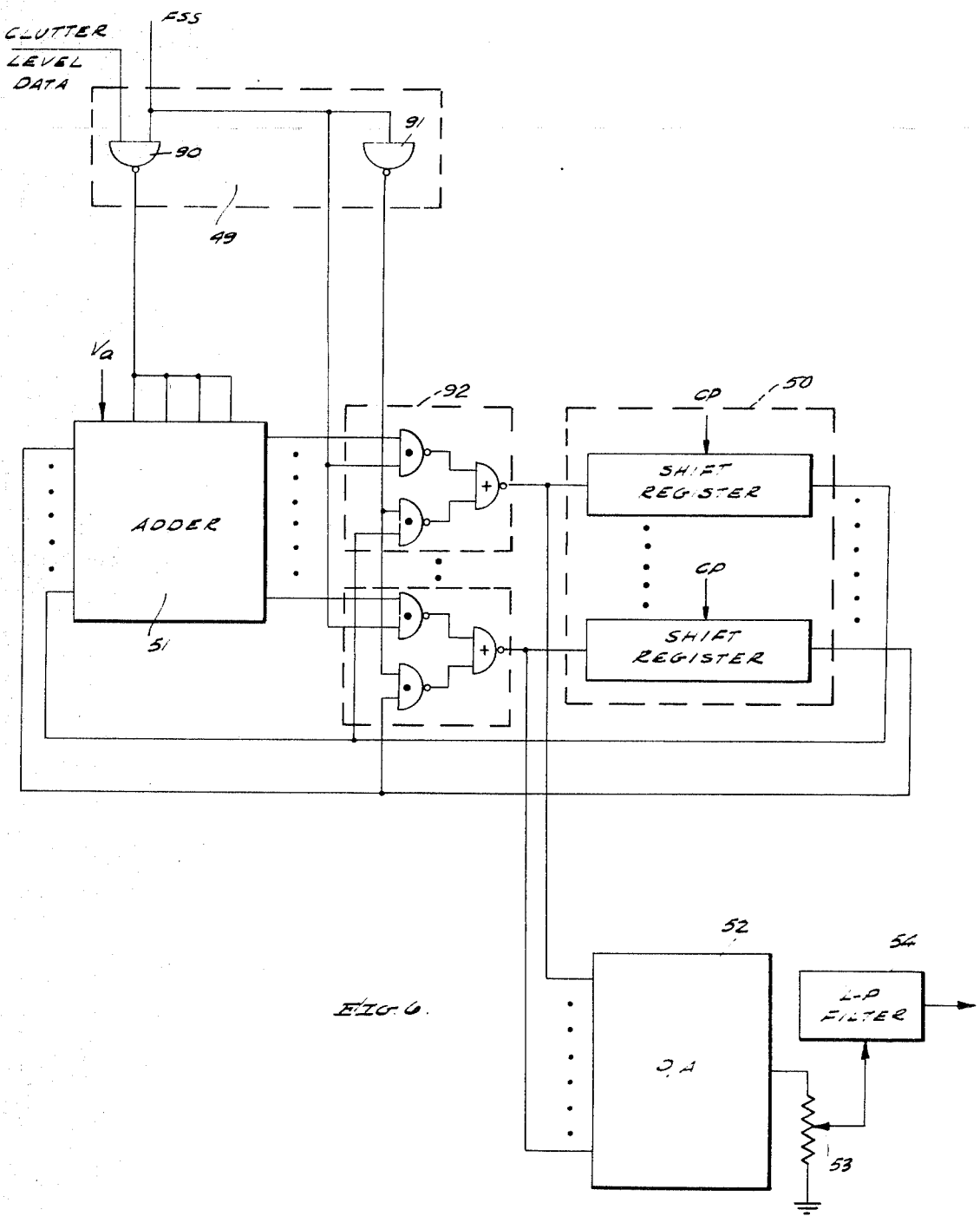

Referring now to FIG. 6, the output of the shift register 48 (FIG. 5) is a train of binary signals applied to the logic network 49 which may consist of a NAND gate 90 enabled by a filter sequence start (FSS) signal. The enabled NAND gate 90 transmits the binary signals to the adder 51 which is implemented in a manner similar to the adder 33 in the radar video noise channel including means for preventing any sum from exceeding full scale or going below zero, except that in practice the adder 51 is adapted for a larger full scale number, such as a 7-bit number, while the adder 33 may be adapted for only a 5-bit full scale number. Another difference is that the register 34 in the noise channel is permitted to enter one new value only during the presence of an EOB signal since one noise AGC value is stored until the end of the next range sweep, while the delay line 50 is permitted to enter new data from the adder 51 in response to each clock pulse, but only during the range sweep while an FSS signal is present. When that signal is not present, the adder 51 neither adds nor subtracts a unit value to the numbers being recirculated to the shift register in response to clock pulses. That is accomplished by enabling a separate set of seven NAND-gate networks functioning as single-pole, double-throw switches through a NAND gate 91 to bypass the adder-subtractor logic. For example, the least significant bit from the adder 51 is transmitted through a NAND-gate network 92 under control of the filter sequence start signal (FSS). When that signal is not true, its complement (FSS) transmitted by the NAND gate 91 causes the NAND-gate network 92 to connect the outputs of the delay line 50 directly to the inputs of the delay line, thus bypassing the adder 51 to recirculate AGC values without alteration until the signal FSS is true again. The delay line preferably comprises a plurality of shift registers, one for each binary order of values to be recirculated, as shown.

Figure 4:
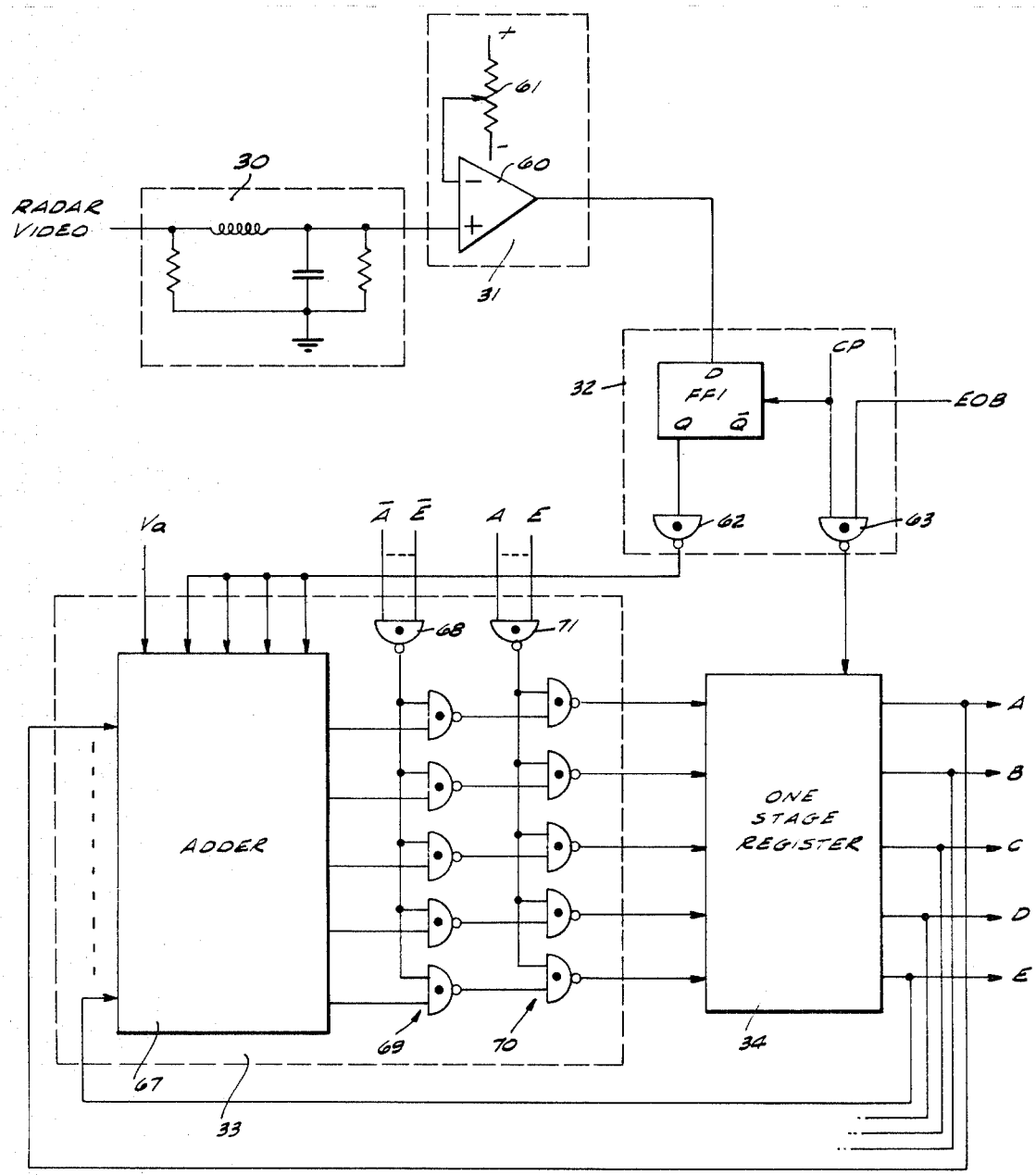
FIG. 4 is a logic diagram for a radar video noise channel of the AGC system of FIG. 2.

The inputs of the delay line 50 are connected directly to the digital-to-analog converter 52 which continually produces an analog AGC signal that is filtered by a low pass filter 54 similar to the low pass filter 30 (FIG. 4). The output of the low pass filter is then a clutter AGC signal transmitted to the summing amplifier 36 (FIG. 2) where it is combined with the noise AGC signal to provide a system AGC signal applied to the radar receiver transmitter 10 to control receiver gain as described hereinbefore.

It should be noted that in the preferred embodiment described with reference to FIGS. 2 through 6, the adders 33 and 51 add a binary +1 or −1 according to whether or not the input signals exceed the references to reduce or increase the receiver gain, but the signs of the binary numbers may be reversed if the manner in which the resulting analog AGC signal is used is reversed. It should also be noted that the positive binary number being added need not be equal to the negative binary number added. For example, whenever either of the two channels exceed its threshold level, a binary number of value +2 may be added to reduce gain faster, and whenever either of the two channels exceeds its threshold level, a binary number of value − 1 may be added. In addition, it should be noted that a filter is provided for only the MTI input signal to the DAGC unit, but that a similar filter may be provided for the video signal input also for smoothing over typically 1 to 4 range elements.

Another variation within the scope of the present invention is digital comparison of threshold levels. The digital-to-analog converter 26 would then be omitted, and the clutter inputs to the DAGC unit would then be outputs of the digital-to-analog converter 21 and the absolute value unit 25. Still other variations will occur to those skilled in the art, some of which are illustrated in the block diagram of FIG. 7.

Figure 7:
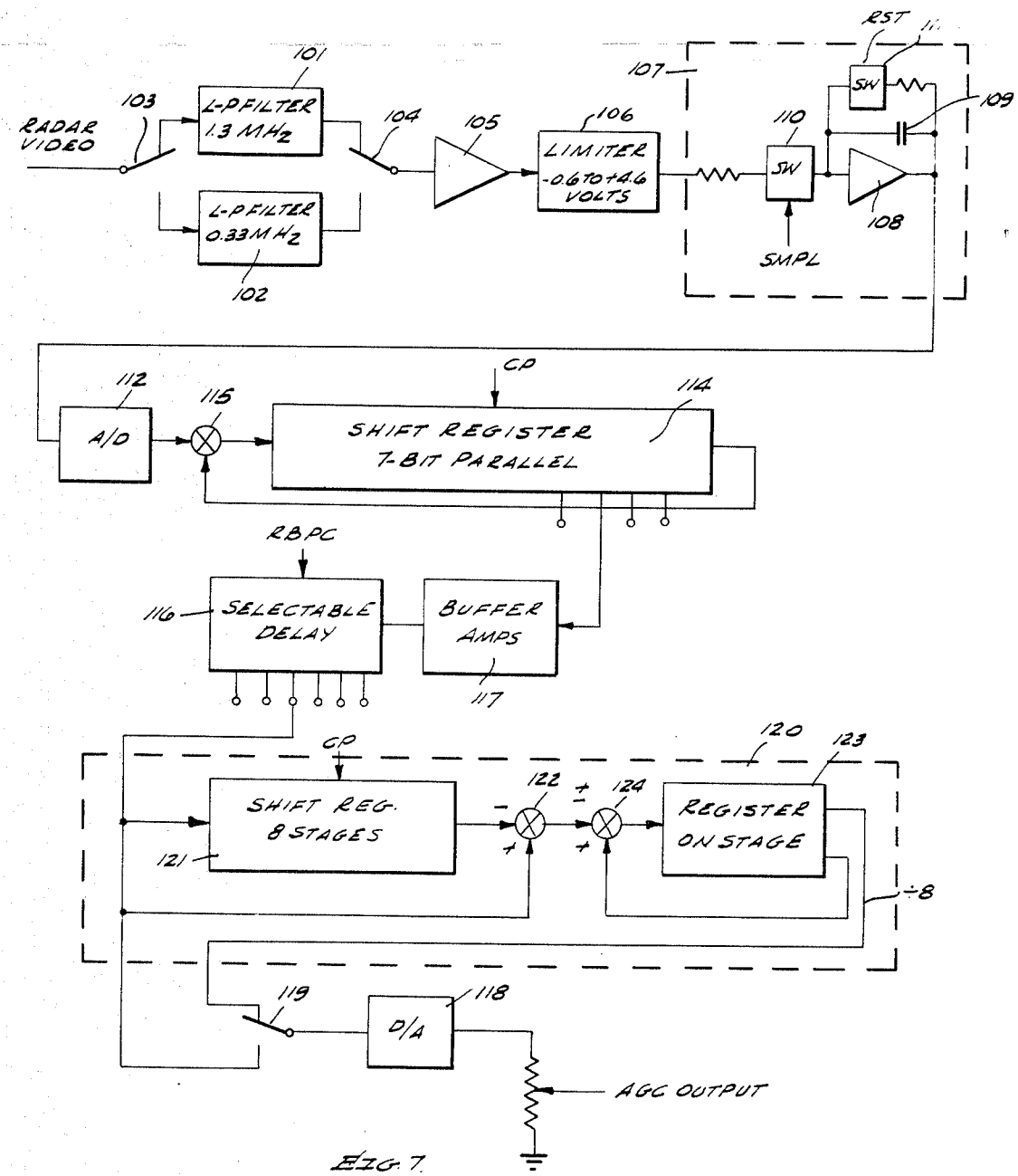
FIG. 7 is a schematic block diagram illustrating a second embodiment of the present invention.

Referring now to FIG. 7, a second embodiment of a digital AGC unit is shown having at least two low-pass filters 101 and 102 with means illustrated as switches 103 and 104 for selectively connecting one of the filters to receive a radar video signal from the radar transmitter/receiver. That arrangement permits smoothing the radar video signal over different numbers of range elements, such as 4 range elements with filter 101 selected, and 16 range elements with the low pass filter 102 selected.

The filtered radar video signal is applied to a video amplifier having a gain of one or two. The amplifier 105 is coupled by a limiter 106 to a sample and hold circuit 107. The limiter 106 limits the video signal to a range typically between −0.6V to +4.6V.

The sample and hold circuit comprises an operational amplifier 108 having a feedback capacitor 109 which is charged through a switch 110 at the beginning of a range element period in response to a sample (SMPL) signal and discharged through a switch 111 in response to a reset (RST) signal at the end of the range element period just before another sample is taken through the switch 110. In the intervening time, an analog-to-digital converter 112 converts into digital form a value proportional to the amplitude of the sample stored in the capacitor 109.

The analog-to-digital converter 112 may be operated as a 1-bit converter, as in the embodiment described with reference to FIGS. 2 through 6, or as many as 4 bits. Assuming a 4-bit conversion, the analog-to-digital converter 112 transmits for each sample a 3-bit binary number plus a sign bit for values between +7 and −7 depending upon the level of the radar video signal with respect to a reference built into the analog-to-digital converter. If the radar video signal level is equal to that reference, the output will be zero. If the radar video signal exceeds that reference, the output will then be a positive binary number from 1 to 7 inclusive. Similarly, if the radar video signal is below the reference, the output will be a negative binary number from −1 to −7 inclusive.

Figure 8:
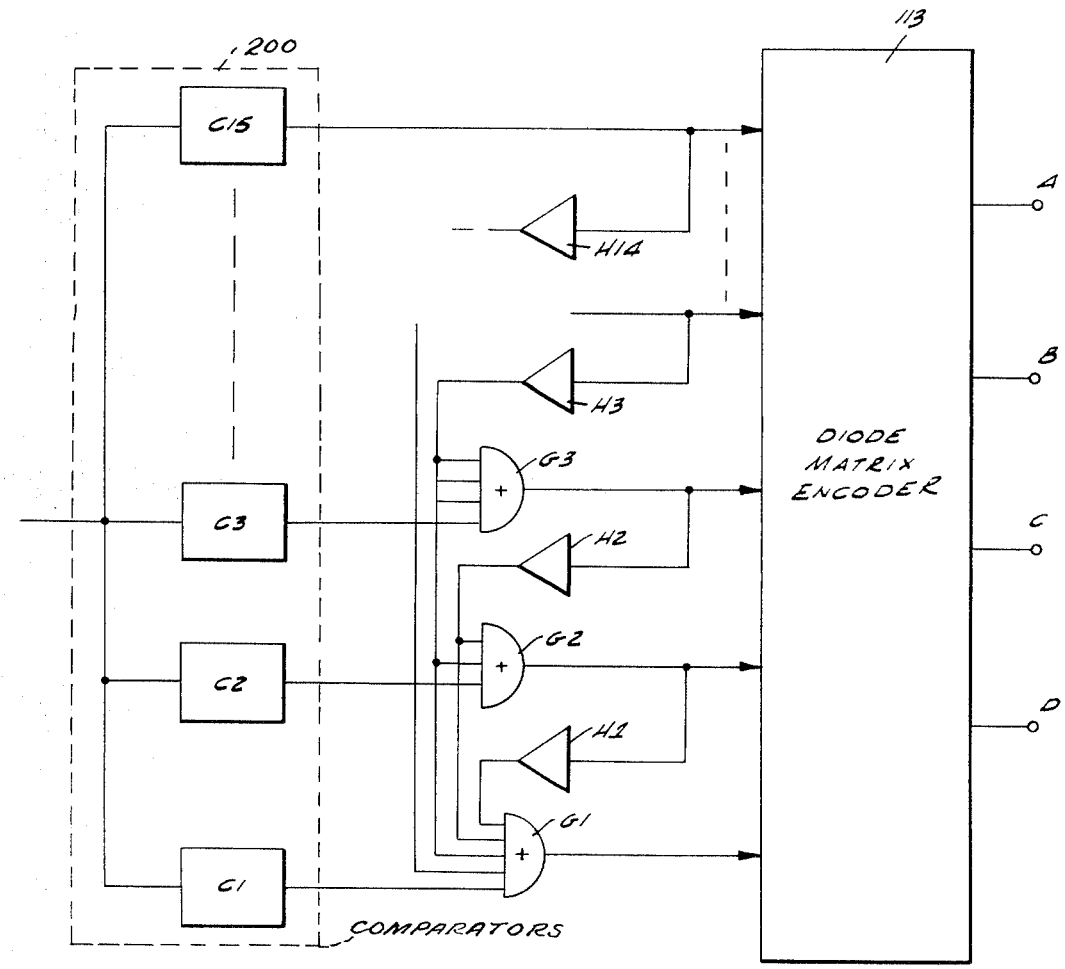
FIG. 8 is a logic diagram for an analog-to-digital converter in the embodiment of FIG. 7.

FIG. 8 illustrates an exemplary embodiment of the 4-bit analog-to-digital converter 112. It consists of 15 comparators 200, each having a reference level according to the following table:

| COMP. | Reference Voltage | Output Decimal | Binary |
|---|---|---|---|
| C1 | −0.6 | −7 | 1111001 |
| C2 | +1.211 | −6 | 1111010 |
| C3 | +1.348 | −5 | 1111011 |
| C4 | +1.502 | −4 | 1111100 |
| C5 | +1.706 | −3 | 1111101 |
| C6 | +1.898 | −2 | 1111110 |
| C7 | +2.138 | −1 | 1111111 |
| C8 | +2.418 | −0 | 0000000 |
| C9 | +2.676 | +1 | 0000001 |
| C10 | +2.991 | +2 | 0000010 |
| C11 | +3.336 | +3 | 0000011 |
| C12 | +3.757 | +4 | 0000100 |
| C13 | +3.248 | +5 | 0000101 |
| C14 | +4.727 | +6 | 0000110 |
| C15 | +5.298 | +7 | 0000111 |

The reference voltage for the first comparator C1 is −0.6V, so that it functions simply as a level shifter to provide at its output terminal a predetermined maximum voltage of, for example, +3 volts to a diode AND gate G1 connected to a diode matrix encoder 113. The encoder will then produce at its output terminals a binary code of a number in the 2's complement form corresponding to a decimal number −7. If the input signal from the sample-and-hold circuit exceeds the reference of the comparator C2, a +3-volt signal is transmitted through a diode AND gate G2 to the encoder 113. The output of the gate G2 is complemented by an inverter H1 to inhibit the gate G1. In that manner, the encoder 113 receives only one signal corresponding to a decimal −6 to produce at its output terminal a corresponding binary number. When the input signal exceeds the threshold of the comparator C3, a diode AND gate G3 transmits a +3-volt signal to the encoder 113. At the same time, an inverter H2 transmits a zero-volt signal to the gates G1 and G2 so that only the gate G3 energizes the diode matrix encoder 113. When the threshold level of the comparator C4 is exceeded, its gate G4 inhibits the gates of lower decimal order of G1 to G3, and so forth until the threshold level of the comparator C15 is exceeded, at which time its output terminal is driven from zero volts to +3 volts to energize the diode matrix encoder 113. An inverter H14 connected to the output of the comparator C15 then inhibits all gates of lower decimal order so that again only one input terminal to the encoder 113 is energized.

It should be noted that the reference voltages in the foregoing table for the comparators C1 to C15 are not increased in equal steps but rather in steps that increase logarithmically, thereby decreasing gain by increasing the digital AGC signal faster when the input signal exceeds the threshold level of the comparator C8. As the input signal level decreases from the desired threshold level of comparator C8, gain of the radar receiver is increased by decreasing the digital AGC signal in smaller steps.

Referring again to FIG. 7, an integrator comprising a delay line 114 and a 7-bit adder 115 receives the output of the converter 112 and updates the digital AGC signal for each range element during each range sweep. The delay line 114 preferably consists of seven shift registers, each having a number of stages equal to the number of range elements in a range sweep. Assuming a range element consists of eight range bins, clock pulses (CP) applied to the shift register are derived from range bin clock pulses divided by eight with the range bin clock pulse period selected for shifting the contents of register 114 during a range bin clock period sufficiently after a sample pulse is generated to permit the analog-to-digital converter 112 to settle. For example, a first counter may be employed to generate a reset pulse after every eighth range bin clock pulse has been counted. The reset pulse is then followed by a sample pulse. A clock pulse may be selected for shifting the registers of the delay line 114 six range bin periods after each sample pulse is generated.

The adder 115 may be a conventional adder with means for inhibiting the output thereof from exceeding full scale or going below zero in the same manner as the adder 33 described hereinbefore with reference to FIG. 4.

The output of the delay line 114 is selected from a stage ahead of the last stage sufficiently to make th digital AGC value developed for a given range element available just prior to a period of that range element. The output of the delay line 114 is then coupled to a selectable delay line 116 through output buffer amplifiers 117, for precise alignment of range element values with the range elements they pertain to.

The selectable delay line 116 comprises seven shift registers having as many stages as there are range bins in a range element. The clock pulses (RBCP) applied to the delay line 116 are range bin clock pulses so that each range element value passing out of the delay line 116 is synchronized with the information being developed in the delay line 114. However, the output of the delay line 116 is selectively taken from output terminals of corresponding stages for the desired delay. For example, if the information is to be delayed four range bins in order to precisely synchronize the digital AGC developed in the delay line 114 with the radar video signal being received, the output terminals of the delay line 116 are precisely four stages from the input terminals of that delay line. In that manner delay compensation is provided with precision allowing synchronization of the digital AGC with the video radar being received to a small fraction of a range element. The output of the selectable delay line 116 is applied to a digital-to-analog converter 118, either directly through switching means 119 or through an averaging means 120.

The function of the averaging means 120 is to provide a running arithmetic average of digital AGC values over a predetermined number of range elements so that the filtering accomplished by the analog low-pass filter 54 (FIG. 6) of the first embodiment may be carried out more precisely in a digital manner. That is accomplished by providing a delay line 121 having a number of stages, such as eight, corresponding to the number of range elements for which an average is desired. The output of the delay line 116 is connected directly to a subtractor 122, and the output of the subtractor is connected to an integrator comprising a register 123 consisting, for example, of ten D-type flip-flops and an adder 124.

The output of the delay line 121 is connected to the subtractor 122 so that, after the first 8 digital AGC values have been accumulated through the subtractor 122 and the adder 124, as each new value is added by the direct connection from the selectable delay line 116 to the subtractor 122, the oldest of the previous eight digital AGC value stored in the delay line 121 is subtracted. Thus, after the first eight range elements the accumulator 123 will have stored the sum of the digital AGC values for the most recent eight elements.

The arithmetic sum of the eight digital AGC values stored in the accumulator 123 is then effectively divided by 8 to form an average. Division is effected by taking the output of the digital-to-analog converter 118 (via the switch 119) from output terminals of the accumulator 123 shifted over 3 binary positions from the sevel least significant bit positions. In other words, a 7-bit digital AGC value into the digital-to-analog converter 118 is then taken from the seven most significant bit positions.

The output of the digital-to-analog converter 118 is applied as an analog AGC signal to the radar receiver in the same manner as for the first embodiment described hereinbefore.

Although particular embodiments of the invention have been described and illustrated herein, it is recognized that modifications and variations may readily occur to those skilled in the art. For example, the video signal may be coupled to the threshold detector 40 by a low-pass filter which will average the signal over a number of range bins, just as the input signal to the MTI clutter channel is filtered, but over a smaller number of range bins, such as four range bins. Consequently, it is intended that the claims be interpreted to cover such modifications and equivalents.

What is claimed is:

1. In a radar system having a moving target filter and a data processing system apparatus for reducing the input dynamic range requirements of said filter and said data processing system by maintaining received signal clutter at a predetermined low voltage level comprising:

a receiver in said system adapted to receive electromagnetic energy and produce in response thereto a video signal with a gain factor controlled by an automatic gain control signal; and means responsive to said video signal and said moving target filter output signal for generating said automatic gain control signal as a function of clutter level in said video signal and residual clutter level in said moving target filter output signal;

means for generating an automatic gain control signal as a function of noise level in said video signal; and means for summing said automatic gain control signals.

2. In a radar system having a moving target indicator filter with a given filter formation period, apparatus for reducing the input dynamic range requirements thereof by maintaining clutter in the input video signal and output moving target indicator signal of said filter substantially constant at a predetermined level comprising:

a receiver in said system adapted to receive electromagnetic energy and produce in response thereto a video signal with a gain factor controlled by an automatic gain control signal;

means for dividing said video signal of each range sweep of said radar system into range elements;

first comparing means for continually comparing said video input signal with a first reference voltage level to obtain a binary-1 signal when said video input signal exceeds said first reference voltage, and a binary-0 signal when said video input signal does not exceed said first reference voltage;

second comparing means for periodically comparing said moving target indicator output signal with a second reference voltage level to obtain a binary-1 signal if said moving target indicator output signal exceeds said second reference voltage level, and a binary-0 signal if said moving target indicator output signal does not exceed said second reference voltage;

integrating means for producing said automatic gain control signal for each successive range element of a given sweep by incrementing a stored value for a given range element during a range sweep if either said first or second comparing means produces a binary-1 signal and decrementing said stored value for said given range element if neither said first or second comparing means produces a binary-1 signal;

means for cyclically reading out said automatic gain control signal during each successive range sweep with range element values thereof synchronized with corresponding range elements; and coupling means for applying said automatic gain control signal read out to said receiver.

3. Apparatus as defined in claim 8 wherein said coupling means includes a low-pass filter means for smoothing out changes in said automatic gain control signal between range elements.

4. Apparatus as defined in claim 3 wherein said filter has a time constant approximately equal to several range element periods.

5. Apparatus as defined in claim 4 including:
third sampling means or sampling the voltage level of said video input signal after the last range sweep for every radar azimuth scan to obtain a signal noise sample;
third comparing means for comparing each signal noise sample with a third reference voltage level to obtain a binary-1 output signal if said signal noise sample exceeds said third reference voltage, and a binary-0 output signal if said signal noise sample does not exceed said third reference voltage;
integrating means for developing a noise level control signal by incrementing or decrementing a stored value according to whether said output signal is a binary 1 or a binary 0 once during each azimuth scan; and
means for adding said noise level control signal to the output of said filter, whereby said automatic gain control signal is provided with a noise component about which a clutter component varies.

6. In a radar system having a data processing system, apparatus for reducing the input dynamic range requirements of said data processing system by maintaining received video signal clutter at a predetermined voltage level comprising:
a receiver in said system adapted to receive electromagnetic energy and produce in response thereto a video signal with a gain factor controlled by an automatic gain control signal;
means for dividing said video signal of each range sweep of said radar system into range elements;
means coupling said automatic gain control signal to said receiver for smoothing out changes in said automatic gain control signal between range elements including means for computing a running average of said automatic gain control signal over a predetermined number of range elements;
means for sampling the voltage level of said video signal for each range element;
means for comparing each sample with a predetermined voltage level to obtain a difference value;
means for continuously accumulating said difference values;
means for producing said automatic gain control signal for each successive range element of a given sweep proportional to the arithmetic sum of all integrated difference values of corresponding range elements of previous range sweeps;
a shift register for delaying difference values a number of range element periods equal to said predetermined number of range elements;
means for continuously subtracting delayed difference values at the output of said shift register from values in said accumulating means; and
means for dividing the output of said accumulating means by said predetermined number to produce said automatic gain control signal for control of said gain factor of said receiver.

7. In a radar system, apparatus for reducing the input dynamic range requirements thereof by maintaining received signal clutter at a predetermined voltage level comprising:
a receiver in said system adapted to receive electromagnetic energy and produce in response thereto a video signal with a gain actor controlled by an automatic gain control signal;
means for generating said automatic gain control signal as a function of deviation of the clutter level in said video signal from said predetermined voltage level;
means for dividing said video signal of each range sweep of said radar system into range elements;
comparing means for comparing the video signal amplitude of each range element with a predetermined voltage level to obtain a digital difference signal, and including an analog-to-digital converter wherein each difference signal comprises a binary number greater than 1;
means for continuously adding said difference signals from corresponding range elements of following range sweeps;
integrating means including an adder and shift registers adapted to recirculate sums from said adder for addition of subsequent difference signals;
means for producing said automatic gain control signal for each successive range element of a given sweep proportional to the sum of digital difference signals of corresponding range element of previous range sweeps, comprising a digital-to-analog converter; and
an analog filter coupling said automatic gain control signal to said receiver and having a time constant approximately equal to several range element periods.

8. In a radar system having a data processing system, apparatus for reducing the input dynamic range requirements of said data processing system by maintaining received video signal clutter at a predetermined voltage level comprising:
a receiver in said system adapted to receive electromagnetic energy and produce in response thereto a video signal with a gain factor controlled by an automatic gain control signal;
means for dividing said video signal of each range sweep of said radar system into range elements;
means for sampling the voltage level of said video signal for each range element;
means for comparing each sample with a predetermined voltage level to obtain a difference value, including an analog-to-digital converter wherein said difference value of each sample greater than said predetermined voltage level is positive, and said difference value of each sample less than said predetermined voltage level is negative;
means for continuously adding said difference values from corresponding range elements of following range sweeps;
integrating means including an adder and shift registers adapted to recirculate sums from said adder back through said adder for addition of subsequent difference values;
means for producing said automatic gain control signal for each successive range element of a given sweep comprising a digital-to-analog converter, said automatic gain control signal being proportional to the arithmetic sum of all integrated difference values of corresponding range elements of previous range sweeps; and
means coupling said automatic gain control signal to said receiver for smoothing out changes in said automatic gain control signal between range elements comprising means for computing a running average of said automatic gain control signal over a predetermined number of range elements.

* * * * *